US012603674B2

(12) United States Patent
Condorelli et al.

(10) Patent No.: US 12,603,674 B2
(45) Date of Patent: Apr. 14, 2026

(54) RADIO COMMUNICATION METHOD AND SYSTEM

(71) Applicant: STMICROELECTRONICS INTERNATIONAL N.V., Geneva (CH)

(72) Inventors: Riccardo Condorelli, Tremestieri Etneo (IT); Antonino Mondello, Messina (IT); Michele Alessandro Carrano, Catania (IT); Salvatore Costa, Partinico (IT); Michele Bottaro, Lentini (IT); Pascal Fabre, Chambery (FR); Philippe Bollard, Drumettaz Clarafond (FR); Felice Alberto Torrisi, Lentini (IT)

(73) Assignee: STMicroelectronics International N.V., Geneva (CH)

( * ) Notice: Subject to any disclaimer, the term of this patent is extended or adjusted under 35 U.S.C. 154(b) by 43 days.

(21) Appl. No.: 18/651,120

(22) Filed: Apr. 30, 2024

(65) Prior Publication Data

US 2024/0405798 A1     Dec. 5, 2024

(30) Foreign Application Priority Data

May 31, 2023     (IT) .......................... 102023000011112

(51) Int. Cl.
*H04B 1/7183*          (2011.01)
*H04L 7/033*          (2006.01)
(52) U.S. Cl.
CPC ........... *H04B 1/7183* (2013.01); *H04L 7/033* (2013.01)

(58) Field of Classification Search
CPC ......... H04B 1/7183; H04B 1/40; H04L 7/033; H03L 7/18; H03L 7/0802
See application file for complete search history.

(56) References Cited

U.S. PATENT DOCUMENTS

| | | | | |
|---|---|---|---|---|
| 6,339,625 B1 | 1/2002 | Tsuchiya | | |
| 2002/0009983 A1 | 1/2002 | Pritchett et al. | | |
| 2003/0093702 A1* | 5/2003 | Luo | ........................... | G06F 1/32 |
| | | | | 713/320 |
| 2004/0158761 A1* | 8/2004 | Matsuoka | ................. | G06F 1/08 |
| | | | | 713/600 |

(Continued)

*Primary Examiner* — Sam K Ahn
*Assistant Examiner* — Amneet Singh
(74) *Attorney, Agent, or Firm* — Alston & Bird LLP

(57)          ABSTRACT

Method of operating a radio communication system during a stand-by time interval in a stand-by state. The method comprises: applying clock division processing to a reference clock signal and producing a divided clock signal; applying PLL processing to the divided clock signal producing a PLL clock signal; receiving at least one input signal; when the input signal has a first logic value, interrupting applying PLL processing to the divided clock signal and enabling counting clock signal edges of the divided clock signal; when said counting clock signal edges reaches a first target count value, restarting applying PLL processing; continuing counting clock signal edges until reaching a second target count value; when said counting reaches the second target count value, issuing and sampling an end-count signal based on the PLL clock signal, producing a timing clock signal as a result and providing the timing clock signal to a user circuit.

20 Claims, 5 Drawing Sheets

(56) References Cited

U.S. PATENT DOCUMENTS

| | | | |
|---|---|---|---|
| 2005/0068111 A1* | 3/2005 | Kasahara | H03L 7/099 |
| | | | 331/16 |
| 2011/0235691 A1 | 9/2011 | Greszczuk et al. | |
| 2012/0293223 A1* | 11/2012 | Watanabe | H03L 7/00 |
| | | | 327/156 |

* cited by examiner

FIG. 1

PRIOR ART

RADIO COMMUNICATION METHOD AND SYSTEM

CROSS REFERENCE TO RELATED APPLICATIONS

This application claims priority to Italian Patent Application No. 102023000011112, filed on May 31, 2023, and entitled "Radio communication method and system," which is hereby incorporated by reference in its entirety and to the maximum extent allowable by law.

TECHNICAL FIELD

The description relates to radio communication systems and methods.

One or more embodiments may be applied in ultra-wideband (UWB) wireless systems and systems-on-chip (briefly, SoCs).

BACKGROUND

Ultra-wideband (briefly, UWB) communications facilitate the transmission of large amounts of signal energy that is exempt from interference, within a given frequency band, with conventional carrier wave transmissions. Therefore, UWB communications facilitate:

- personal area network (briefly, PAN) wireless connectivity at increased data-rates,
- longer range applications at reduced data-rate, and
- transparent co-existence of radar and imaging systems with existing communications systems.

UWB is configured to have a reduced energy consumption when the transmission/reception (briefly, TX/RX) phase of operation is completed. Such a reduced energy consumption state is currently known as "standby RF" state.

The energy consumption of a UWB system during the standby RF state is a relevant figure of merit for UWB applications, as the TX/RX operations are relatively short in comparison to the duration of the standby RF phase.

While the system is in the standby RF state, the internal functionalities are limited to those of a clock generator or timer currently known as "MAC_TIMER" which is used to "wake-up" the TX/RX operating functionalities of the system after lapse of a certain time interval.

Existing solutions to maintain the MAC_TIMER active during standby RF use a phase-locked loop (briefly, PLL) as the source of a clock signal output by the MAC_TIMER.

The PLL is configured to generate a clock signal having a same phase of a source clock but a different frequency. To maintain the phase-lock condition, the PLL is constantly operating and receiving a power supply, resulting in an excessive energy consumption for the UWB system.

The PLL is suitable to generate the clock at a frequency suitable to get accurate timing between two consecutive "wake-up" events which could take place at a distance of nanoseconds (1 nanosecond=1 ns=$10^{-9}$ seconds).

Keeping the PLL turned on is somewhat in contrast with the reduced energy consumption constraints for UWB systems.

Systems that rely on the PLL to generate the clock therefore have the drawback of a relatively increased energy consumption.

Current approaches to reducing the energy consumption of the PLL involve reducing the clock speed at the expense of timing resolution. This may lead to reducing granularity of the counter, that is the minimum interval that can be counted (also currently referred to as counting "step").

BRIEF SUMMARY

An object of one or more embodiments is to contribute in adequately addressing the issues discussed in the foregoing.

According to one or more embodiments, that object can be achieved via a method having the features set forth in the claims that follow.

One or more embodiments may relate to a corresponding system.

The claims are an integral part of the technical teaching provided herein with reference to the embodiments.

One or more embodiments facilitate providing a PLL architecture that at same time provides a the timer functionality, preferably with high temporal resolution, and low power consumption.

One or more embodiments can be applied to mobile electronic devices, such as mobile phones, laptop, and other battery-powered and consumption-sensitive devices.

One or more embodiments facilitate an adjustable control of power and performance exempt from excessive energy consumption.

BRIEF DESCRIPTION THE DRAWINGS

One or more embodiments will now be described, by way of non-limiting example only, with reference to the annexed Figures, wherein:

FIG. 1 is a diagram exemplary of a PLL device,

Corresponding numerals and symbols in the different figures generally refer to corresponding parts unless otherwise indicated.

Figure 2:
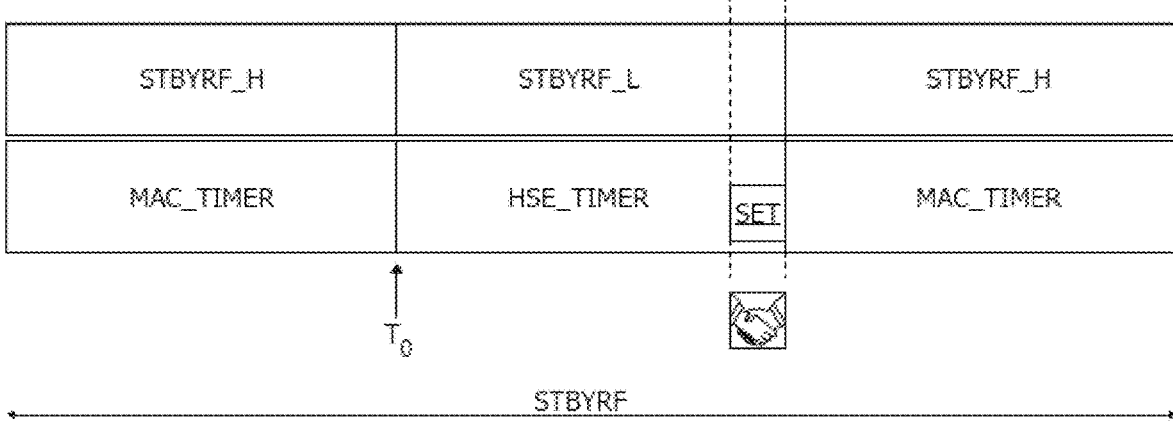
FIG. 2 is a diagram exemplary of a method as per the present disclosure.

The figures are drawn to clearly illustrate the relevant aspects of the embodiments and are not necessarily drawn to scale.

The edges of features drawn in the figures do not necessarily indicate the termination of the extent of the feature.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

For the sake of simplicity, in the following detailed description a same reference symbol may be used to designate both a node/line in a circuit and a signal which may occur at that node or line.

For the sake of simplicity, one or more embodiments are discussed in the following with reference to signals which have clock frequencies around 2 GHz, being otherwise understood that such a frequency value is purely exemplary and in no way limiting. One or more embodiments may be applied to scenarios using clock signal having virtually any value of clock signal frequencies.

Figure 1:
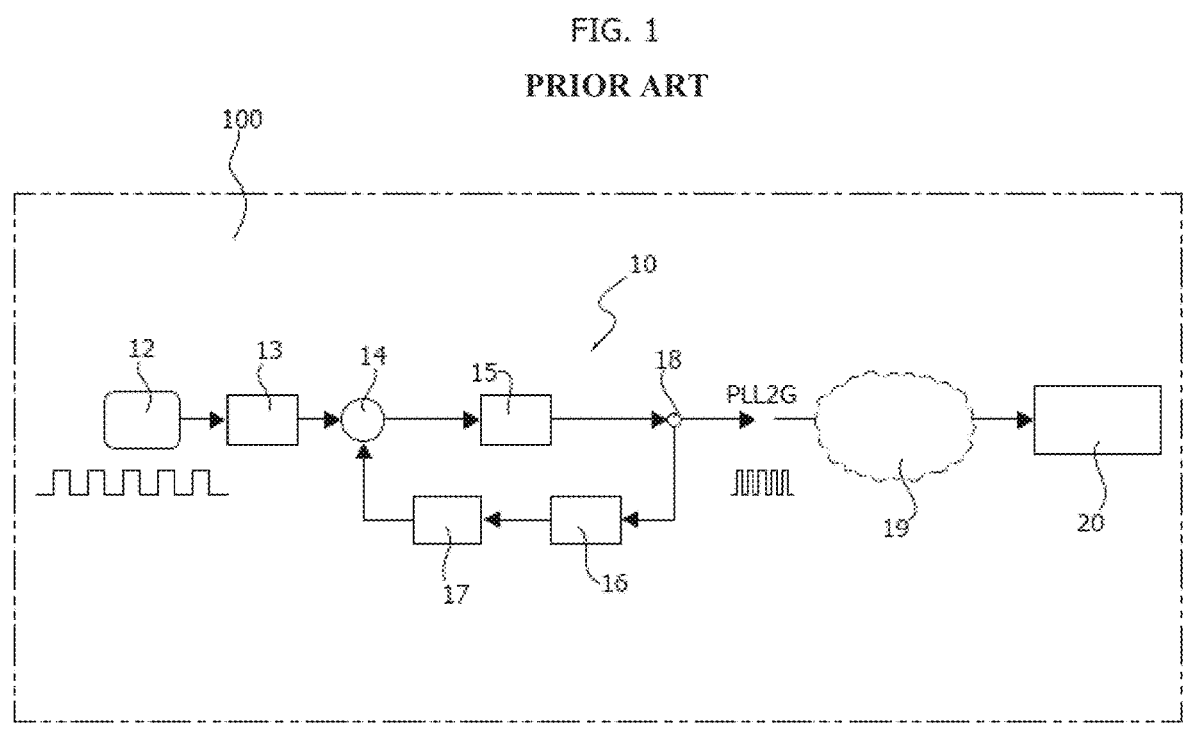

As exemplified in FIG. 1, a (e.g., UWB) radio system 100 comprises a legacy PLL device 10, comprising:

a reference clock generator circuit block 12 configured to provide a reference clock signal HSE having a reference clock period TREE, a clock divider circuit block 13 coupled to the reference clock generator circuit block 12 to receive the reference clock signal HSE therefrom, the clock divider circuit block 13 configured to produce a divided clock signal HSEDIV having a divided clock period which is a fraction of the reference period $T_{REF}$, a phase comparator circuit block 14 coupled to a voltage-controlled oscillator (briefly, VCO) 15, the phase comparator circuit block 14 configured to provide at an output node 18 a PLL clock signal PLL2G based on the divided clock signal HSEDIV and on a feedback signal fb which is applied to the divided clock signal HSEDIV via the phase comparator circuit block 14; specifically, the phase comparator circuit block 14 is performs a comparison of the phase of the clock signal output by block 17 and the clock signal output by block 13, producing as a result a signal proportional to the phase difference therebetween;

a set of feedback circuit blocks 16, 17 coupled to the output node 18 to receive the signal generated by the VCO 15 and to the phase comparator circuit block 14 to provide the feedback signal fb thereto, the set of feedback circuit blocks 16 comprising divider circuits configured to apply time or frequency division to the signal provided by the VCO, in a manner per se known.

For instance, a relation between the frequency of the PLL signal PLL2G and the frequency (that is, a reciprocal function of the period) of the reference clock HSE can be expressed as:

$$f_{PLL2G} = \frac{f_{HSE}}{HSEDIV} \cdot POSTDIV \cdot PREDIV$$

where

HSEDIV is the divider frequency of the frequency divided clock HSEDIV, and

POSTDIV times PREDIV is the frequencies of the feedback signal fb produced by blocks 16 and 17, respectively.

As exemplified in FIG. 1, the PLL device 10 is coupled to a MAC timer 20 configured to issue a wake-up signal for other subsystems of the UWB system 100 in response to lapse of a certain number of clock periods of the PLL signal PLL2G.

Optionally, a further set of frequency divider circuit blocks 19 may be coupled to the output node 18 in order to reduce timing resolution and therefore power consumption.

As exemplified in FIG. 2, a method of further reducing the energy consumption during a standby state STBYRF of a radio system 100 is based on the observation that the energy consumed by the PLL can be varied, for instance in three phases:

during a "high consumption" standby state STBYRF_H, the PLL generator 10 is on and the MAC_TIMER operates based on the clock signal PLL2G;

in response to receiving a freeze signal at a first time instant T0, activating a "low consumption" standby state STBYRF_L during which a low-speed counter HSE TIMER; specifically, the system may introduce a delay between the time instant TO at which the freeze signal is received and a time instant at which the low-consumption standby state STBYRF_L is activated;

during a transitional phase, the high-speed clock PPL2G is activated to be ready in order to turn on another "high consumption" standby state STBYRF_H to complete counting with the MAC_TIMER.

Figure 3:
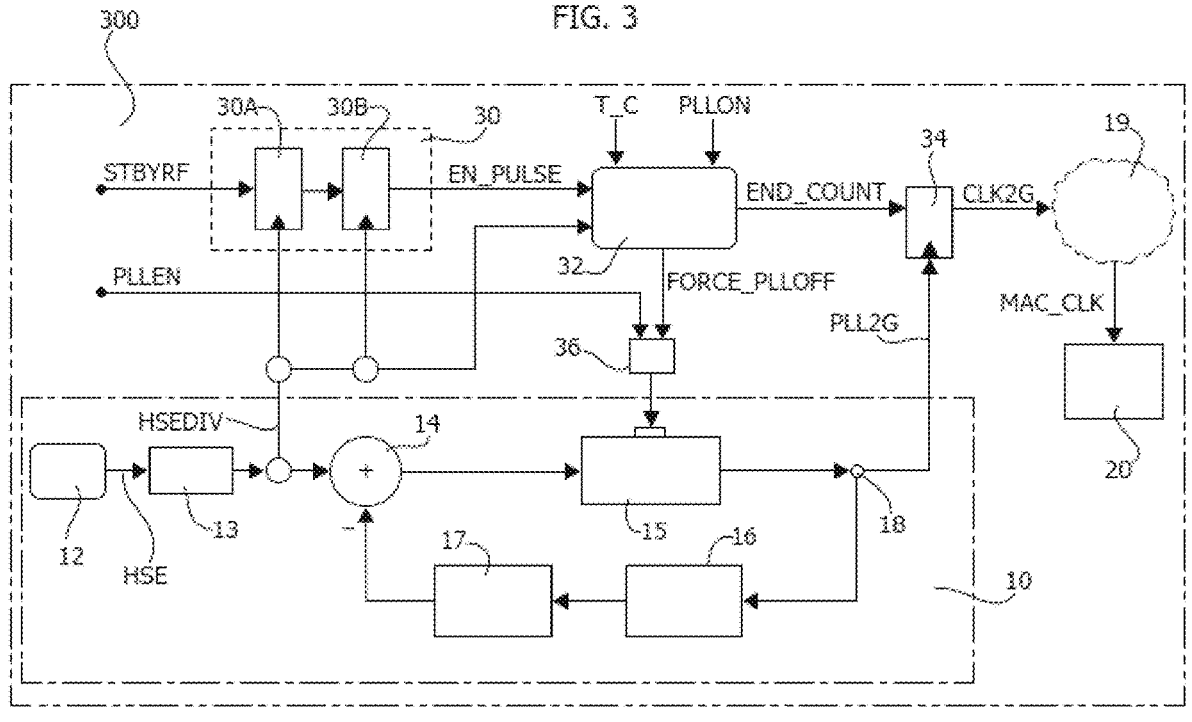
FIG. 3 is a diagram exemplary of a system as per the present disclosure.

FIG. 3 is exemplary of a (e.g., UWB) radio system 300 configured to implement the method exemplified in FIG. 2.

As exemplified in FIG. 3, in addition to the legacy PLL 10, the further set of frequency dividers 19 and the timer circuit block 20, the system 300 comprises:

a first input node STDBYRF configured to receive a first input signal STDBYRF to activate the "low consumption" standby operation of the system 300, a second input node PLLEN configured to receive a input signal PLLEN to enable activation of the PLL 10 at the beginning of operation of the system, a synchronization circuit block 30 comprising a set of memory circuit blocks 30A, 30B, such as flip flop circuits 30A, 30B, and coupled to the clock divider circuit block 13 of the PLL device 10 to receive the divided clock signal HSEDIV therefrom; the divided clock signal HSEDIV is used to clock the flip-flop circuits 30A, 30B to sample the first input signal STDBYRF at the divided clock periods, producing an enable pulse signal EN_PULSE as a result;

an auxiliary counter 32 coupled to the synchronization circuit block 30 to receive the pulse enable signal therefrom, to the PLL device 10 to receive the divided clock signal HSEDIV therefrom, and having a set of setting parameters T_C, PLLON comprising a target parameter T_C and a trigger parameter PLLON whose value can be adapted to the application scenario; the auxiliary counter 32 is configured to produce an end counter signal END_COUNT and a force signal FORCE_PLLOFF based on the enable pulse EN_PULSE, the divided clock signal HSEDIV and the set of parameter values T_C, PLLON, as discussed in the following;

a further memory circuit block 34, such as a further flip flop circuit 34, for instance, coupled to the auxiliary counter 32 to receive the end counter signal END_COUNT therefrom and coupled to the output node 18 of the PLL device 10 to receive the PLL clock signal PLL2G, the further memory circuit block 34 configured to produce an auxiliary clock signal CLK2G as discussed in the following; and a logic circuit block 36, such as a NAND or AND logic circuit block 36, having a first input node coupled to the second input node PLLEN and a second input node coupled to the auxiliary counter 32 to receive the force signal FORCE_PLLOFF therefrom, the logic circuit block 36 coupled to the VCO circuit block 15 of the PLL device 10 to control operation thereof based on the output of the logic circuit block 36, as discussed in the following.

Figure 4:
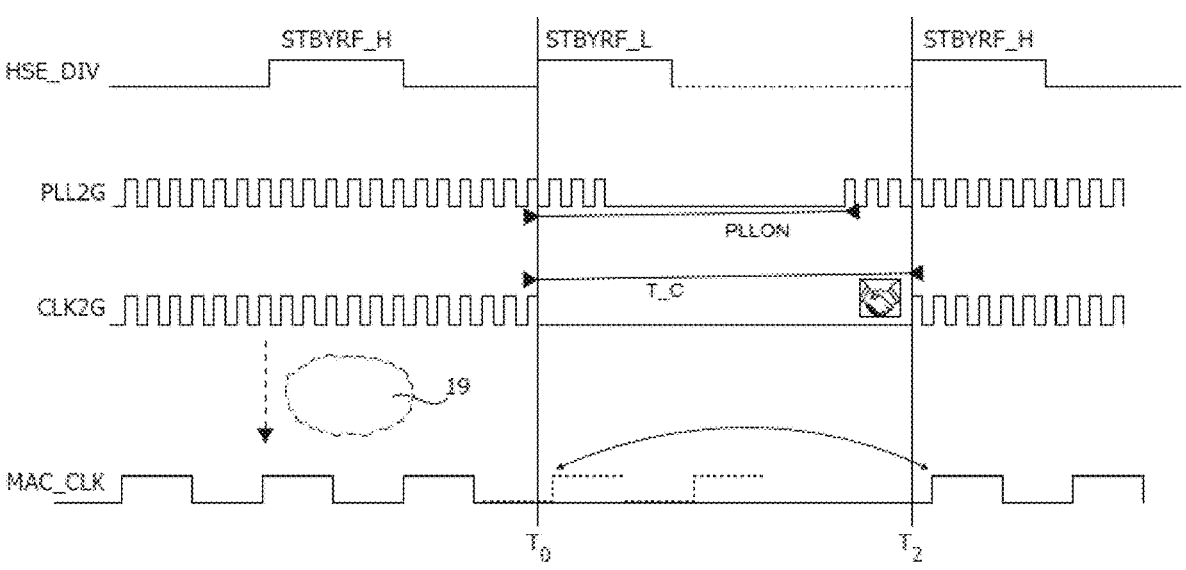
FIG. 4 is a diagram exemplary of an evolution over time of signals involved in the system of FIG. 3.

FIG. 4 is a diagram exemplary of timing of signals in the system 300 exemplified in FIG. 3 which further illustrate the method exemplified in FIG. 2.

As exemplified in FIG. 4, for instance:

at the first time instant T0, the first input signal STD-BYRF has a first logic value (e.g., "1" or "high") to indicate that the system goes into the standby state while the second input signal PLLEN is (from the beginning, that is the activation of the system) at the first logic value (e.g., "1" or "high"); with some delay introduced by flip-flops 30A, 30B, in response to the first input signal STDBYRF having the first logic value, the counter 32 asserts the FORCEPLL_OFF signal (e.g., with the logic value "1" or "high") to interrupt the PLL device 10 from generating the PLL signal PLL2G, which is also output by the further memory circuit block 34 and provided to the frequency dividers 19 to output the timer signal MAC_CLK to the MAC timer circuit block 20; in this "low consumption" standby state STBYRF_L also the auxiliary clock signal CLK2G goes to zero; specifically, the counter 32 acts like a gate, halting propagation of the clock signal CLK2G by acting on circuit block 34 and asserting the FORCEPLL_OFF signal;

at a second time instant, the auxiliary counter 32 reaches the trigger parameter value PLLON and de-asserts the force signal FORCE_PLLOFF (e.g., with the logic value "0" or "low") so that the PLL device 10 is re-activated and the PLL signal PLL2G while the auxiliary clock signal CLK2G remains low;

at a third time instant T2, in response to the auxiliary counter 32 reaching the target parameter value T_C, and the auxiliary counter 32 issues the END_COUNT signal that triggers re-start of the auxiliary clock signal CLK2G so that the system 300 enters again the "high consumption" standby state STBYRF_H.

As exemplified in FIG. 4, thanks to the architecture of the system 300 (for instance thanks to the use of the trigger parameter to re-start the PLL before the end of the low-consumption standby state), the phase relation between the first clock edge of the MAC_CLK after the third time instant T2 and before the first time instant T0 remain conserved notwithstanding the interruption of generation of the signal.

Figure 5:
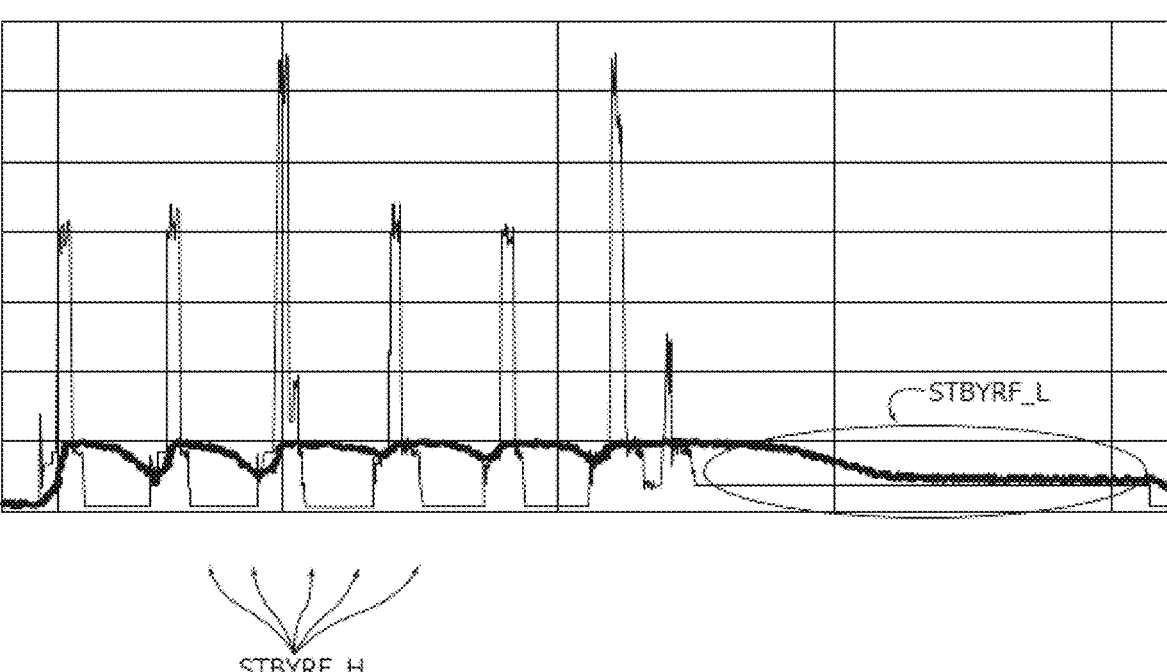
FIG. 5 is a temporal diagram exemplary of an evolution over time of power-related signals involved in the system as per the present disclosure.

FIG. 5 is a plot exemplary of current intensity over time in different stand by operation states.

As exemplified in FIG. 5, the energy saving in terms of current intensity used to power the PLL device 10 that can be obtained using the method and system 300 as per the present disclosure can be substantial, as appreciable by comparing the peaked part of the plot of "high consumption" operation STDBYRF_H with the remaining part of "low consumption" STRBYRF_L of the plot.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A method of operating a radio communication system during a stand-by time interval in which the radio communication system is in a stand-by state comprising:

providing a reference clock signal having a reference clock period;

applying clock division processing to the reference clock signal producing a divided clock signal as a result;

applying phase-locked loop (PLL) processing to the divided clock signal producing a PLL clock signal as a result, wherein the PLL clock signal has a PLL clock period greater than the reference clock period;

receiving at least one input signal during a first part of the stand-by time interval;

in response to the at least one input signal having a first logic value, interrupting the applying PLL processing to the divided clock signal and enabling counting clock signal edges of the divided clock signal;

in response to the counting clock signal edges of the divided clock signal reaching a first target count value, and during a second part of the stand-by time interval, restarting the applying PLL processing to the divided clock signal;

continuing the counting clock signal edges of the divided clock signal until reaching a second target count value;

in response to the counting clock signal edges of the divided clock signal reaching the second target count value, and during a third part of the stand-by time interval, issuing an end-count signal and sampling the end-count signal based on the PLL clock signal producing a timing clock signal as a result; and providing the timing clock signal to a user circuit.

2. The method of claim 1, wherein the user circuit comprises a timer circuit configured to measure a duration of the stand-by time interval.

3. The method of claim 2, wherein, during the second part of the stand-by time interval, the timing clock signal has a clock edge that is in a continuous phase relation with the clock edge of the PLL clock signal before interrupting the applying PLL processing to the divided clock signal.

4. The method of claim 3 further comprising applying frequency division to the timing clock signal and providing a frequency divided timing clock signal to the user circuit as a result.

5. The method of claim 2 further comprising applying frequency division to the timing clock signal and providing a frequency divided timing clock signal to the user circuit as a result.

6. The method of claim 1, wherein, during the second part of the stand-by time interval, the timing clock signal has a clock edge that is in a continuous phase relation with the clock edge of the PLL clock signal before interrupting the applying PLL processing to the divided clock signal.

7. The method of claim 6 further comprising applying frequency division to the timing clock signal and providing a frequency divided timing clock signal to the user circuit as a result.

8. The method of claim 1 further comprising applying frequency division to the timing clock signal and providing a frequency divided timing clock signal to the user circuit as a result.

9. A radio communication system configured to be operated during a stand-by time interval in which the radio communication system is in a stand-by state, the radio communication system comprising:

a reference clock generator circuit block configured to provide a reference clock signal having a reference clock period;

a clock division processing circuit block configured to apply clock division processing to the reference clock signal, producing a divided clock signal as a result;

a phase-locked loop (PLL) circuit block configured to apply PLL processing to the divided clock signal, producing a PLL clock signal as a result, the PLL clock signal having a PLL clock period greater than the reference clock period;

a first input node configured to receive at least one input signal, during a first part of a stand-by time interval;

processing circuitry comprising a counter circuit, the processing circuitry configured to:

in response to the at least one input signal having a first logic value, asserting an interrupt signal and providing the interrupt signal to the PLL circuit block, thereby interrupting the applying PLL processing to the divided clock signal and enabling the counter circuit to count clock signal edges of the divided clock signal;

in response to the counter circuit reaching a first target count value, during a second part of the stand-by time interval, restart the applying PLL processing to the divided clock signal;

continue the counting, via the counter circuit, of the clock signal edges of the divided clock signal until reaching a second target count value, in response to the counter circuit reaching the second target count value, during a third part of the stand-by time interval, issuing an end-count signal and sampling the end-count signal based on the PLL clock signal, producing a timing clock signal as a result, and timing circuitry configured to provide the timing clock signal to a user circuit.

10. The radio communication system of claim 9, wherein the user circuit comprises a timer circuit configured to measure a duration of the stand-by time interval.

11. The radio communication system of claim 10, wherein, during the second part of the stand-by time interval, the timing clock signal has a clock edge that is in a continuous phase relation with the clock edge of the PLL clock signal generated before interrupting the applying PLL processing to the divided clock signal.

12. The radio communication system of claim 11, further comprising a set of frequency dividing circuit blocks configured to apply frequency division to the timing clock signal, providing a frequency divided timing clock signal to the user circuit as a result.

13. The radio communication system of claim 10, further comprising a set of frequency dividing circuit blocks configured to apply frequency division to the timing clock signal, providing a frequency divided timing clock signal to the user circuit as a result.

14. The radio communication system of claim 10 further comprising an ultra-wide band radio communication system.

15. The radio communication system of claim 9, wherein, during the second part of the stand-by time interval, the timing clock signal has a clock edge that is in a continuous phase relation with the clock edge of the PLL clock signal generated before interrupting the applying PLL processing to the divided clock signal.

16. The radio communication system of claim 15, further comprising a set of frequency dividing circuit blocks configured to apply frequency division to the timing clock signal, providing a frequency divided timing clock signal to the user circuit as a result.

17. The radio communication system of claim 15 further comprising an ultra-wide band radio communication system.

18. The radio communication system of claim 9, further comprising a set of frequency dividing circuit blocks configured to apply frequency division to the timing clock signal, providing a frequency divided timing clock signal to the user circuit as a result.

19. The radio communication system of claim 18 further comprising an ultra-wide band radio communication system.

20. The radio communication system of claim 9 further comprising an ultra-wide band radio communication system.

* * * * *